United States Patent Office 3,487,103
Patented Dec. 30, 1969

3,487,103
METHOD OF MANUFACTURE OF ARGININE ASPARTATE
Mortimer D. Sackler, 10 E. 64th St.,
New York, N.Y. 10021
No Drawing. Filed June 23, 1965, Ser. No. 466,458
Int. Cl. C07c *101/24, 103/14*
U.S. Cl. 260—501.11                                    9 Claims

ABSTRACT OF THE DISCLOSURE

A method for preparing arginine aspartate comprising the passing of a solution of a salt of aspartic acid over a basic ion exchange resin to form an aspartic-resin complex eluting said aspartic-resin complex with an acid salt of arginine and recovering crystalline arginine aspartate therefrom.

---

This invention relates to a new and novel method for the preparation of arginine aspartate. Up to the present, in order to obtain the salt arginine aspartate at a purity level suitable for pharmaceutical application, the older methods have utilized a process of directly reacting arginine with aspartic acid in aqueous solutions, followed by recrystallization, or a process employing the double decomposition of salts of arginine and of salts of aspartic acid, followed by recrystallization. Both methods are difficult to carry out on the industrial level because they result in a poor yield of the pure product. The present invention describes a new method of preparing arginine aspartate through the use of ion-exchange resins, which makes it possible to obtain this product in a state of high degree of purity and in excellent yield. The disadvantages inherent in th older methods are avoided and the new salt is obtained in a form suitable for therapeutic use.

The method in accordance with the present invention, therefore, consists in passing a solution of a salt of aspartic acid over a strongly basic ion-exchange resin of the quaternary ammonium type in order to adsorb the aspartic anion on the said resin and to transform the latter into the aspartic-resin form or complex, then passing a solution of a mixture of mono- and di-salts of arginine in a ratio of 2:1, as an eluant solution, over the aspartic-resin form and collecting the eluate which is concentrated, allowed to crystallize at low temperature, washed with alcohol and dried.

The invention will be illustrated by two examples given by way of illustration and not of limitation:

EXAMPLE 1

A strongly basic anion-exchange resin of the quaternary ammonium type, for instance a polystyrene-trimethylbenzyl ammonium resin, in an amount of 1000 ml. is converted into the chloride form by reacting the resin with hydrochloric acid. It is washed with distilled water to remove all traces of hydrochloric acid and an aqueous solution of normal calcium aspartate is passed over the resin which has been prepared in this way. A 10% excess of aspartate solution over the theoretical ion exchange capacity of the resin is used, and washing with water is effected until the wash water is free of chloride ions. By this treatment, the resin is transformed to the aspartic-resin form.

A solution containing 168.56 grams of arginine monohydrochloride and 49.44 grams of arginine dihydrochloride per liter is prepared, and this solution is passed slowly over the aspartic resin which has been prepared in the manner indicated above. The effluent liquid is collected in fractions of 200 ml. then of 100 ml. and toward the end, in fractions of 50 ml.

After about 1000 ml. of eluate have been collected the following fractions are examined very carefully until traces of chloride appear. The chloride-free fractions of eluate are combined. The arginine present is determined by Sakaguchi's method. The total nitrogen in the eluates is determined. The amount of chloride-free liquid collected is about 1300 ml. The determination indicates that the amount of arginine aspartate contained in the eluates is about 270 to 300 grams per liter. The eluates are evaporated to a volume of about 500 ml. and allowed to crystallize at low temperature (0 to +4° C.). After seeding by a crystalline seed of arginine aspartate, there are obtained colorless crystals which, after filtration, washing with an aqueous alcoholic solution and drying, have a decomposition point of 220° C. Yield: about 210 grams, i.e., 70% of the theoretical yield. One can evaporate the mother liquors from this first crystallization down to a volume of about 150 ml. Upon adding alcohol until a cloud persists, and cooling to 0° C., there is obtained a second crystalline fraction, the yields of which can be increased by adding alcohol after crystallization of the greater portion and setting this mixture aside for 48 hours at 0° C. The second fraction consists of 75 grams of a crystalline mass which has the same physical-chemical and chemical properties as the main fraciton. The product, in 10% aqueous solution, has a rotatory power of 4.3° and the total yield obtained by this method is about 90 to 95 percent of the theoretical.

EXAMPLE 2

A basic anion-exchange resin of the quaternary ammonium type, for instance a polystyrene dimethylethanol benzyl ammonium resin, in an amount of 1000 ml. is transformed into the chloride form by reacting the resin with hydrochloric acid. It is washed with distilled water to remove all traces of hydrochloric acid and an aqueous solution of normal sodium aspartate is passed over the resin which has been prepared in this manner. A 10% excess of aspartate solution over the theoretical exchange capacity of the resin is used, and washing is effected with water until the wash water is free of chloride ions. By this treatment, the resin is converted into the aspartic-resin form.

A solution containing 179.8 grams of arginine hydrogen sulfate and 54.67 grams of arginine sulfate per liter is prepared, and this solution is slowly passed over the aspartic resin prepared in the manner indicated above. The efflux liquid is collected in fractions of 200 ml. and then of 100 ml. and toward the end, in fractions of 50 ml.

After having collected about 1000 ml. of eluate, the following fractions are examined very carefully until traces of sulfate appear. The sulfate-free fractions of eluate are combined. The arginine present is determined by Sakaguchi's method. The total nitrogen in the eluates is determined. The amount of sulfate-free liquid collected is about 1000 to 1500 ml. The determination indicates that the amount of arginine aspartate contained in the eluates is of the order of 280 to 305 grams per liter. The eluates are evaporated down to a volume of about 500 ml. and allowed to crystallize at low temperature (0 to +4° C.). After seeding by a crystal seed or arginine aspartate, colorless crystals are obtained which, after filtration, washing with an aqueous alcoholic solution and drying, have a decomposition point of 222° C. Yield: about 200 grams, namely 67% of the theoretical yield. The mother liquors of this first crystallization can be evaporated down to a volume of about 150 ml. By adding alcohol until a cloud persists and cooling to 0° C., a second crystalline fraction is obtained, the yields of which can be increased by adding alcohol, after crystallization of the greater portion and setting this mixture aside for 48 hours at 0° C. The second fraction consists of 80 grams of a crystalline mass which has the same physical-chemical and chemical properties as the main fraction. The product, in 10% aqueous solution, has a rotatory power of 4.3°; the total yield obtained by this method is about 90 to 95 percent of the theoretical.

What is claimed is:

1. A method of manufacturing arginine aspartate which comprises passing a solution of an inorganic salt of aspartic acid over a strongly basic ion exchange resin of the quaternary ammonium type in the chloride form, to form an aspartic-resin complex, then passing as an eluate a solution of at least one salt of arginine, selected from the group consisting of the mono-hydrochloride and di-hydrochloride salts of arginine hydrochloride and arginine sulfate, collecting the eluate and recovering therefrom the crystallized arginine aspartate.

2. A method of manufacturing arginine aspartate which comprises passing an aqueous solution of an inorganic salt of aspartic acid over a strongly basic ion exchange resin of the quaternary ammonium type in the chloride form, to form the aspartic-resin complex, then passing as an eluate solution over the aspartic-resin complex a mixture of mono-hydrochloride and di-hydrochloride salts of arginine in the ratio of about 2:1.

3. The process of claim 2 in which said inorganic salt of aspartic acid is the calcium salt and in which the arginine salts are respectively mono-hydrochloride and di-hydrochloride aspartate.

4. The method of claim 1, said salt of arginine being arginine mono-hydrochloride.

5. The method of claim 1, said salt of arginine being arginine di-hydrochloride.

6. The method of claim 1, said salt of arginine being arginine sulfate.

7. The method of claim 1, said salt of arginine being arginine hydrosulfate.

8. The method of claim 1, said salt of aspartic acid being calcium aspartate.

9. The method of claim 1, said salt of aspartic acid being sodium aspartate.

References Cited

UNITED STATES PATENTS 3,015,655   1/1962   Stark _____ 260—534

FOREIGN PATENTS 1,371,770   8/1964   France.

BERNARD HELFIN, Primary Examiner

M. W. GLYNN, Assistant Examiner